(12) United States Patent
Mukai et al.

(10) Patent No.: US 9,130,383 B2
(45) Date of Patent: Sep. 8, 2015

(54) CHARGING/DISCHARGING CONTROL DEVICE, BATTERY PACK, ELECTRICAL EQUIPMENT, AND CHARGING/DISCHARGING CONTROL METHOD

(75) Inventors: Koichi Mukai, Tochigi (JP); Yuji Furuuchi, Tochigi (JP); Toshiaki Araki, Tochigi (JP); Chisato Komori, Tochigi (JP); Koji Ejima, Tochigi (JP); Takashi Fujihata, Tochigi (JP)

(73) Assignee: DEXERIALS CORPORATION, Tokyo (JP)

( * ) Notice: Subject to any disclaimer, the term of this patent is extended or adjusted under 35 U.S.C. 154(b) by 288 days.

(21) Appl. No.: 13/824,907

(22) PCT Filed: Apr. 19, 2012

(86) PCT No.: PCT/JP2012/060536
§ 371 (c)(1),
(2), (4) Date: Mar. 18, 2013

(87) PCT Pub. No.: WO2012/147598
PCT Pub. Date: Nov. 1, 2012

(65) Prior Publication Data
US 2013/0181681 A1 Jul. 18, 2013

(30) Foreign Application Priority Data

Apr. 27, 2011 (JP) ................... 2011-099834

(51) Int. Cl.
*H02J 7/00* (2006.01)
*H01M 10/44* (2006.01)

(52) U.S. Cl.
CPC ........... *H02J 7/0031* (2013.01); *H01M 10/441* (2013.01); *H02J 7/007* (2013.01); *H02J 7/0021* (2013.01)

(58) Field of Classification Search
USPC .................................. 320/134–136
See application file for complete search history.

(56) References Cited

U.S. PATENT DOCUMENTS 5,789,900 A    8/1998   Hasegawa et al.
6,133,711 A *  10/2000  Hayashi et al. ............... 320/128
(Continued)

FOREIGN PATENT DOCUMENTS

EP        1 282 211 A2    2/2003
JP        A-10-208779     8/1998
(Continued)

OTHER PUBLICATIONS

International Search Report issued in International Patent Application No. PCT/JP2012/060536 mailed Jul. 10, 2012.
(Continued)

*Primary Examiner* — Samuel Berhanu
(74) *Attorney, Agent, or Firm* — Oliff PLC (57) ABSTRACT

A charging/discharging control device that can protect a chargeable/dischargeable battery cell from an excess current state while preventing the device from being increased in scale and from being complex. The charging/discharging control device includes: switches that are connected in parallel on current paths between a battery and a positive terminal of a battery pack; a switching control unit that switches between a charging current path and a discharging current path; a protective element that fuses the charging current path when a current value of the charging current path flowing through the switch exceeds a first fusing current value; and a protective element that fuses the discharging current path when a current value of the discharging current path flowing through the switch exceeds a second fusing current value higher than the first fusing current value.

10 Claims, 10 Drawing Sheets

(56) References Cited

U.S. PATENT DOCUMENTS

| | | |
|---|---|---|
| 2002/0017896 A1 | 2/2002 | Hogari et al. |
| 2005/0221164 A1* | 10/2005 | Kawazu et al. ............... 429/61 |
| 2007/0210751 A1* | 9/2007 | Wang et al. ................ 320/116 |
| 2009/0058362 A1* | 3/2009 | Yun .............................. 320/134 |
| 2010/0085014 A1* | 4/2010 | Saeki et al. ................ 320/134 |

FOREIGN PATENT DOCUMENTS

| | | |
|---|---|---|
| JP | A-2001-351697 | 12/2001 |
| JP | 2005-168215 A | 6/2005 |
| JP | A-2006-60892 | 3/2006 |
| JP | A-2007-135359 | 5/2007 |
| JP | 2009-238538 A | 10/2009 |

OTHER PUBLICATIONS

Jun. 5, 2015 Search Report issued in European Application No. 12777722.5.

\* cited by examiner

CHARGING/DISCHARGING CONTROL DEVICE, BATTERY PACK, ELECTRICAL EQUIPMENT, AND CHARGING/DISCHARGING CONTROL METHOD

FIELD OF THE INVENTION

The present invention relates to a charging/discharging control device that controls charging/discharging of a battery, a battery pack in which the charging/discharging control device is incorporated, electrical equipment detachably connected to the battery pack, and a charging/discharging control method.

The present application asserts priority rights based on JP Patent Application No. 2011-099834 filed in Japan on Apr. 27, 2011. The total contents of disclosure of the patent application of the senior filing date are to be incorporated by reference into the present application.

BACKGROUND OF THE INVENTION

A charging/discharging circuit that controls charging/discharging of a secondary battery such as a lithium-ion secondary battery has a function of cutting off a current path flowing in the battery by operating a plurality of protective elements. More specifically, such a charging/discharging control circuit on/off-controls a current path flowing in a battery by using a switching transistor during a normal charging/discharging operation. However, since current value rises for a time longer than an operation time of the switching transistor when an instantaneous large current typified by a lightning surge is generated, a protective circuit such as a fuse that cuts off a current path is arranged in terms of excess-current protection. The charging/discharging circuit detects a condition of a battery, i.e., a voltage, a temperature, or the like to determine an abnormal state on the basis of the detection result, and on/off-controls a current path flowing in the battery by using a switching transistor or the like.

Patent Document 1 describes a protective circuit having a protective element that forcibly fuses a current path flowing in the battery in a noninvertible state when overcharge to the battery is detected, when the temperature of the battery abnormally increases, and when a switching element erroneously operates due to heat generation during charging of a secondary battery.

PRIOR-ART DOCUMENT

Patent Document

PTL 1: Japanese Patent Application Laid-Open No. 2007-135359

SUMMARY OF THE INVENTION

In a protective circuit described in Patent Document 1 described above, in order to perform protection from an excess-current state, a current path is fused by using a protective element of one system. When current values in a charging state and a discharging state are not considerably different from each other, protection from an excess-current state can be performed by using the protective circuit.

In contrast to this, in order to cope with an application in which a current values in a charging state and a discharging state are considerably different from each other, for example, a mode of use in which a charging current is considerably larger than a charging current as in an electric tool, a protective element for excess-current protection must be designed in accordance with a discharging current. The protective element designed for excess-current protection in accordance with a discharging current cannot be used by a current value that must be protected in a charging operation, and protection from an excess-current state in a charging state cannot be satisfactorily performed.

For the problem, for example, positive terminals of two systems are arranged for a battery pack, a protective element for excess-current protection in a discharging state and a protective element for excess-current protection in a charging state are connected to the systems of the positive terminals, respectively, to make it possible to perform protection from an excess-current state.

However, when the number of terminals increases, the terminal structure and the internal structure of the battery pack become complex, and the number of mechanical parts increases, and a problem of an increase in size of a battery pack housing is posed. A device to protect the terminals from being erroneously used by a user is required, and a problem of necessity of a complex mechanism to protect an erroneous use is also posed.

The present invention has been proposed in consideration of the above circumstances, and has as its object to provide a charging/discharging control device that can protect a chargeable/dischargeable battery cell from both excess-current states in a charging state and a discharging state while preventing a device scale from being increased and the device from being complex even in a mode of use in which values of currents flowing in charging and discharging states are considerably different from each other, a battery pack in which the charging/discharging control device is incorporated, and a charging/discharging control circuit.

As a means for solving the above problem, a charging/discharging control device according to the present invention that controls charging/discharging of a battery arranged in a battery pack and obtained by connecting at least one chargeable/dischargeable battery cell in series, includes: first and second switches that are connected in parallel on current paths between the battery and an external terminal of the battery pack; a switching control unit that switches between a charging current path and a discharging current path by turning on the first switch and turning off the second switch during a charging operation and turning off the first switch and turning on the second switch during a discharging operation; a first protective element that fuses the charging current path when a current value of the charging current path flowing through the first switch exceeds a first fusing current value; and a second protective element that fuses the discharging current path when a current value of the discharging current path flowing through the second switch exceeds a second fusing current value higher than the first current value.

In a battery pack according to the present invention that includes a battery obtained by connecting at least one chargeable/dischargeable battery cell in series and a charging/discharging control circuit that controls charging/discharging of the battery, the charging/discharging control circuit includes: first and second switches that are connected in parallel on current paths between the battery and an external terminal of the battery pack; a switching control unit that switches between a charging current path and a discharging current path by turning on the first switch and turning off the second switch during a charging operation and turning off the first switch and turning on the second switch during a discharging operation; a voltage detection unit that detects a voltage of the battery cell; a first protective element that fuses the charging current path when a current value of the charging current path flowing through the first switch exceeds a first fusing current value; and a second protective element that fuses the discharging current path when a current value of the discharging current path flowing through the second switch exceeds a second fusing current value higher than the first current value.

Electrical equipment according to the present invention includes a battery pack having a battery obtained by connecting at least one chargeable/dischargeable battery cell in series and a charging/discharging control circuit that controls charging/discharging of the battery and an equipment main body that is detachably connected to the battery pack and charges the battery pack or is driven with a power supply from the battery pack. The charging/discharging control circuit includes: first and second switches that are connected in parallel on current paths between the battery and an external terminal of the battery pack; a switching control unit that switches between a charging current path and a discharging current path by turning on the first switch and turning off the second switch during a charging operation and turning off the first switch and turning on the second switch during a discharging operation; a voltage detection unit that detects a voltage of the battery cell; a first protective element that fuses the charging current path when a current value of the charging current path flowing through the first switch exceeds a first fusing current value; and a second protective element that fuses the discharging current path when a current value of the discharging current path flowing through the second switch exceeds a second fusing current value higher than the first current value.

A charging/discharging control method according to the present invention that controls charging/discharging of a battery arranged in a battery pack and obtained by connecting at least one chargeable/dischargeable battery cell in series, by using first and second switches that are connected in parallel on current paths between the battery and an external terminal of the battery pack, a charging current path and a discharging current are switched by turning on the first switch and turning off the second switch during a charging operation and turning off the first switch and turning on the second switch during a discharging operation, a first protective element connected to the charging current path is fused when a current value of the charging current path flowing through the first switch exceeds a first fusing current value, and a second protective element connected to the discharging current path is used when a current value of the discharging current path flowing through the second switch exceeds a second fusing current value higher than the first current value.

Effects of Invention

Even in a mode of use in which current values flowing in charging/discharging states are considerably different from each other, connections of the charging current path and the discharging current path are switched by the first and second switches to protect a device scale from being increased and the device from being complex, and, by using the first protective element connected to the charging current path and the second protective element connected to the discharging current path, the chargeable/dischargeable battery cell can be protected from both excess-current states in the charging state and the discharging state.

DETAILED DESCRIPTION OF THE INVENTION

A mode for carrying out the present invention will be described below in detail with reference to the accompanying drawings. The present invention is not limited to only the following embodiments, and various changes can be effected without departing from the spirit and scope of the invention, as a matter of course.

Figure 1:
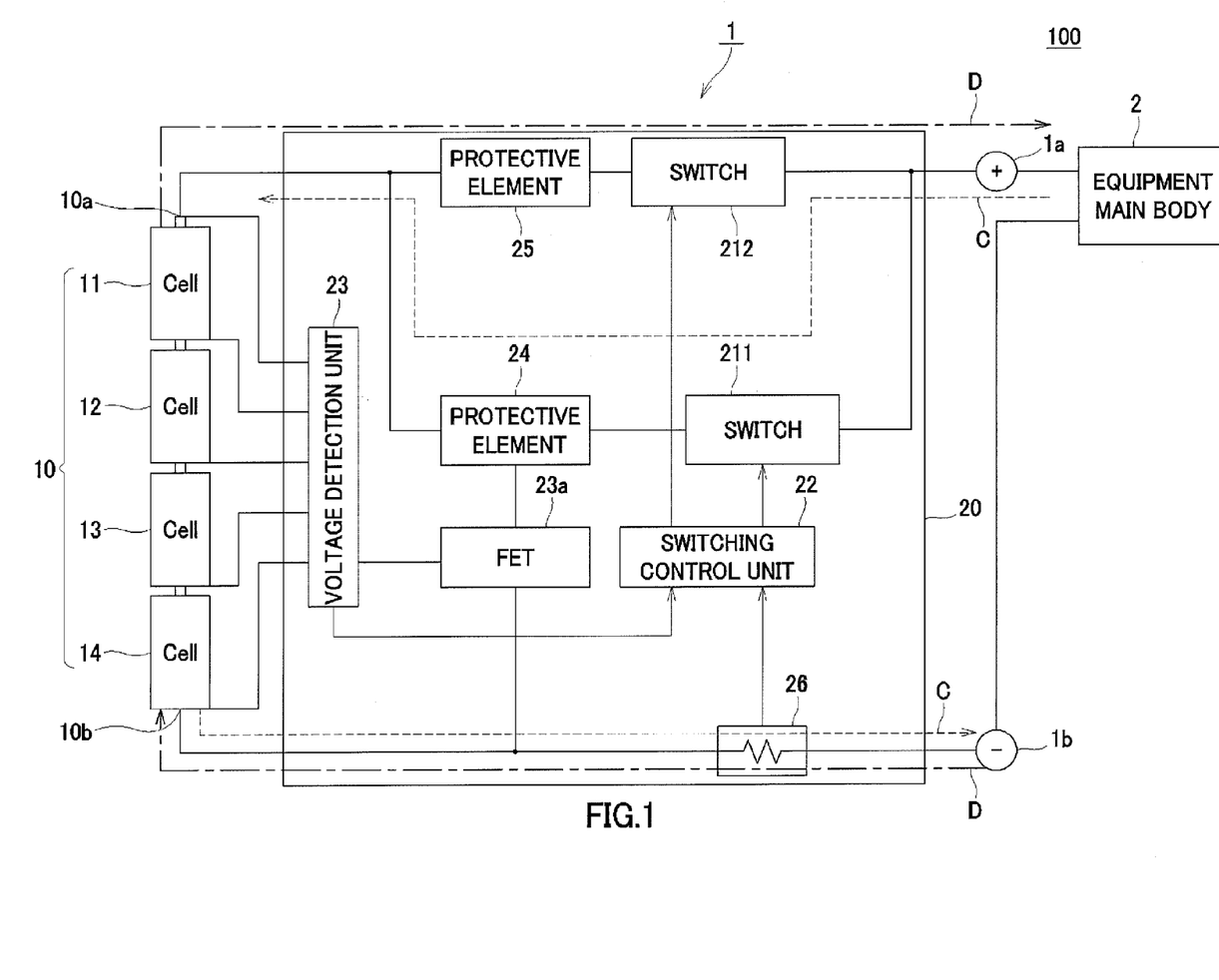
FIG. 1 is a diagram for explaining a configuration of a charging/discharging control circuit according to a first embodiment.

A charging/discharging control device to which the present invention is applied is a circuit that controls charging/discharging of a battery. A charging/discharging control circuit 20 according to a first embodiment is incorporated in, for example, a battery pack 1 having a battery 10 obtained by connecting a total of four chargeable/dischargeable battery cells 11 to 14 as shown in FIG. 1 in series with each other.

The battery pack 1 is a battery incorporated in an electrical equipment 100. The battery pack 1 is detachably connected to an equipment main body 2 of the electrical equipment 100 that charges the battery pack 1 or is driven with a power supply from the battery pack 1. In the battery pack 1 detachably connected to the equipment main body 2, a positive terminal 1a and a negative terminal 1b are connected to a positive terminal 10a and a negative terminal 10b of the battery 10 through the charging/discharging control circuit 20, respectively.

Under the connection relationship, the charging/discharging control circuit 20 includes two switches 211 and 212, a switching control unit 22, a voltage detection unit 23, two protective elements 24 and 25, and a current detection resistor 26.

Figure 2:
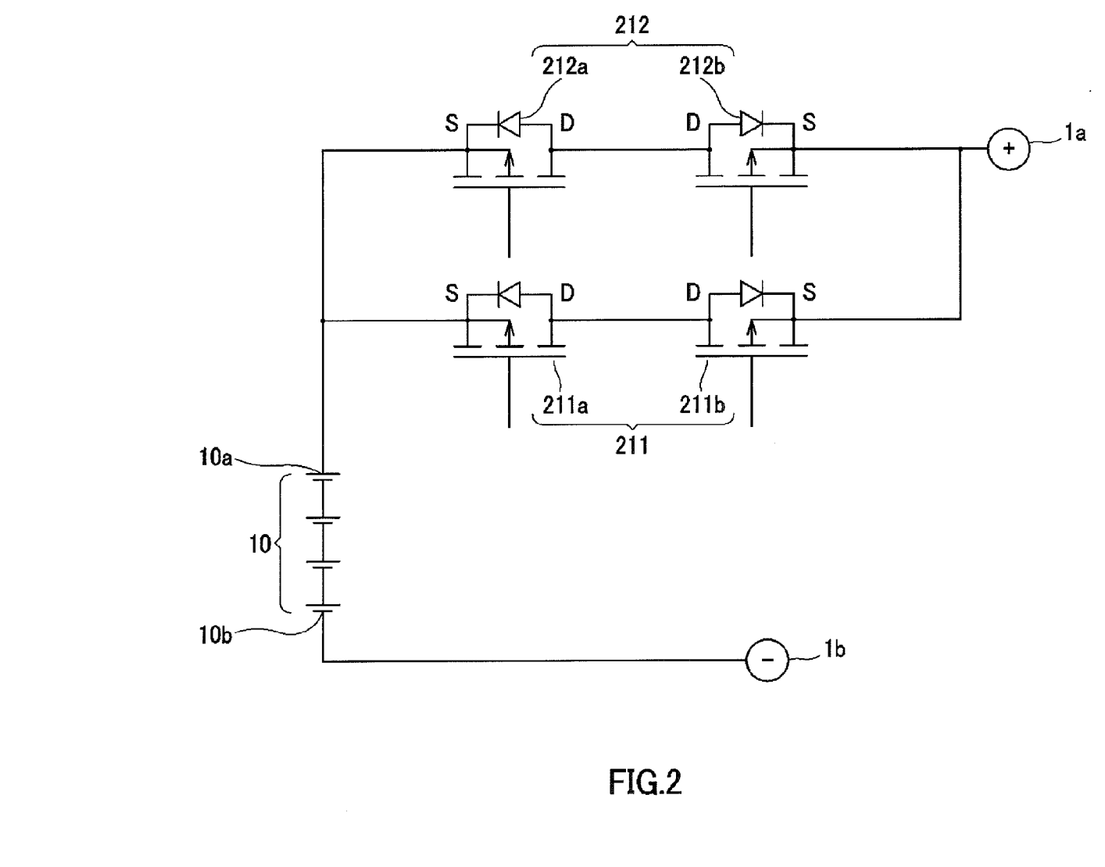
FIG. 2 is a diagram for explaining a concrete configuration of a switch according to the first embodiment.

The switches 211 and 212 are connected in parallel between the positive terminal 10a of the battery 10 and the positive terminal 1a of the battery pack 1, and are on/off-controlled by the switching control unit 22. The switches 211 212, as will be described later, may be elements that opens/closes a charging current path C and opens/closes a discharging current path D. However, for example, as shown in an equivalent circuit diagram that shows connection relationships between the battery 10 and the switches 211 and 212 as shown in FIG. 2, each of the switches 211 and 212 includes two field effect transistors.

More specifically, the switch 211 includes switching transistors 211a and 211b connected in series such that directions of biases of parasitic diodes are opposite to each other. Similarly, the switch 212 includes switching transistors 212a and 212b connected in series such that directions of biases of parasitic diodes are opposite to each other.

The switching control unit 22 includes a microprocessor or the like, and on/off-controls the switches 211 and 212 depending on a charging operation and a discharging operation as will be described below.

Figure 3A:
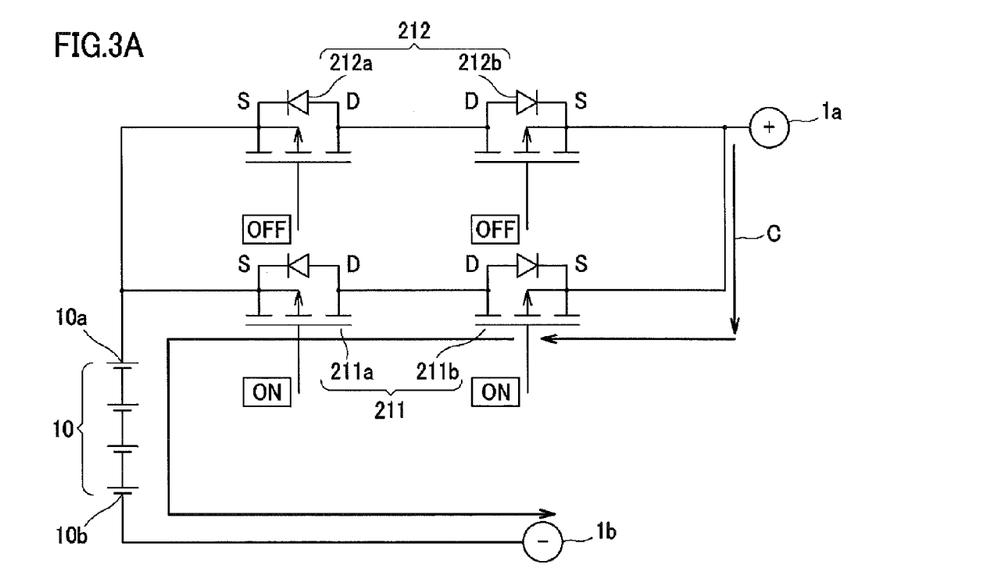
FIG. 3A is a diagram for explaining a concrete operation of a switch in a charging operation.

In a charging operation, the switching control unit 22, as shown in FIG. 3A, turns on the two switching transistors 211a and 211b configuring the switch 211 and turns off the two switching transistors 212a and 212b configuring the switch 212. In this manner, the switching control unit 22 controls a charging current to cause the charging current to flow on the charging current path C indicated by a broken line in FIG. 1 and a solid line in FIG. 3A. The switching control unit 22 turns off the switching transistor 212b of the switch 212 having a bias direction being opposite to a direction of a charging current to make it possible to cut off the charging current to prevent the charging current from flowing through the switch 212.

In the charging operation, when the switching control unit 22 determines an overcharge state on the basis of voltages of battery cells 11 to 14 detected by the voltage detection unit 23 (will be described later), the two switching transistors 211a and 211b configuring the switch 211 and being in an on state are turned off. When the switching control unit 22 determines an excess-current state on the basis of a current value flowing in the battery 10 detected by the current detection resistor 26 (will be described later), the two switching transistors 211a and 211b configuring the switch 211 and being in an on state are turned off.

Figure 3B:
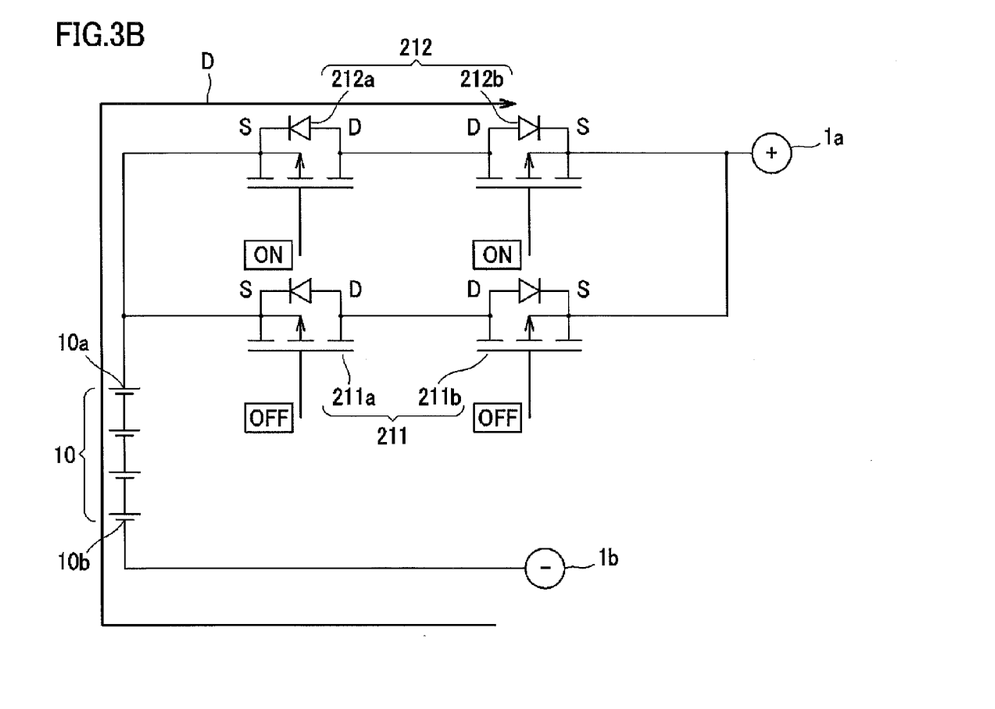
FIG. 3B is a diagram for explaining a concrete operation of the switch in a discharging operation.

In a discharging operation, the switching control unit 22, as shown in FIG. 3B, turns off the two switching transistors 211a and 211b configuring the switch 211 and turns on the two switching transistors 212a and 212b configuring the switch 212. In this manner, in the charging/discharging control circuit 20, a discharging current is controlled to flow on the discharging current path D indicated by a chain line in FIG. 1 and a solid line in FIG. 3B.

In the discharging operation, when the switching control unit 22 determines an overdischarge state on the basis of the voltages of battery cells 11 to 14 detected by the voltage detection unit 23 (will be described later), the two switching transistors 212a and 212b configuring the switch 212 and being in an on state are turned off. When the switching control unit 22 determines an excess-current state on the basis of a current value flowing in the battery 10 and detected by the current detection resistor 26 (will be described later), the two switching transistors 212a and 212b configuring the switch 212 and being in an on state are turned off.

The voltage detection unit 23 detects the voltages of the battery cells 11 to 14 to notify the switching control unit 22 of the detected voltages. In the voltage detection unit 23, a switching transistor 23a to control an operation of the protective element 24 depending on a detection result is arranged. In this case, when the voltage detection unit 23 detects that the battery cells 11 to 14 are in an overcharge state, the charging current path is not cut off by the switch 211, and, thereafter, the voltages exceed a predetermined voltage, the voltage detection unit 23 turns on the switching transistor 23a depending on the detection result and operates a heat generator 243 of the protective element 24 to fuse the charging current path C.

Figure 4:
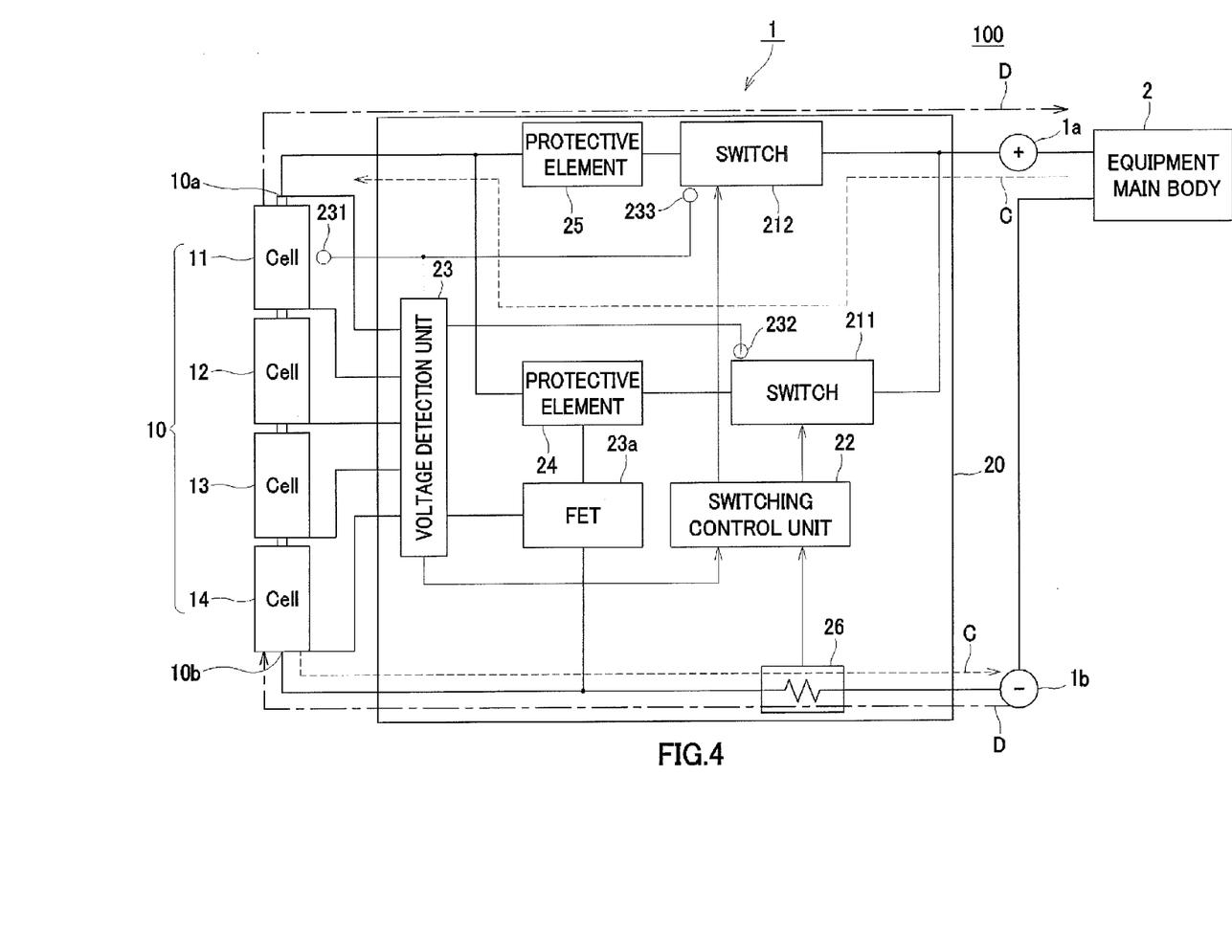
FIG. 4 is a diagram for explaining a modification of a voltage detection unit according to the first embodiment.

In the voltage detection unit 23, for example, as shown in FIG. 4, a plurality of temperature detection elements 231, 232, and 233 are arranged, and an operation of the switching transistor 23a may be controlled depending on detection results of the temperature detection elements 231, 232, and 233. For example, the temperature detection element 231 detects a temperature near the battery 10, the temperature detection element 232 detects a temperature near the switch 211, and the temperature detection element 233 detects a temperature near the switch 212. In the voltage detection unit 23, for example, when the temperature detection element 231 detects that the temperature near the battery 10 is 85° C. or more, or when the temperature detection elements 232 and 233 detect that the temperatures near the switches 211 and 212 are 135° C. or more, the switching transistor 23a may be turned on. In this manner, a function of protecting the battery 10 in a charging operation on the basis of temperature statuses of the sections in the battery pack 1 can be realized.

Figure 5:
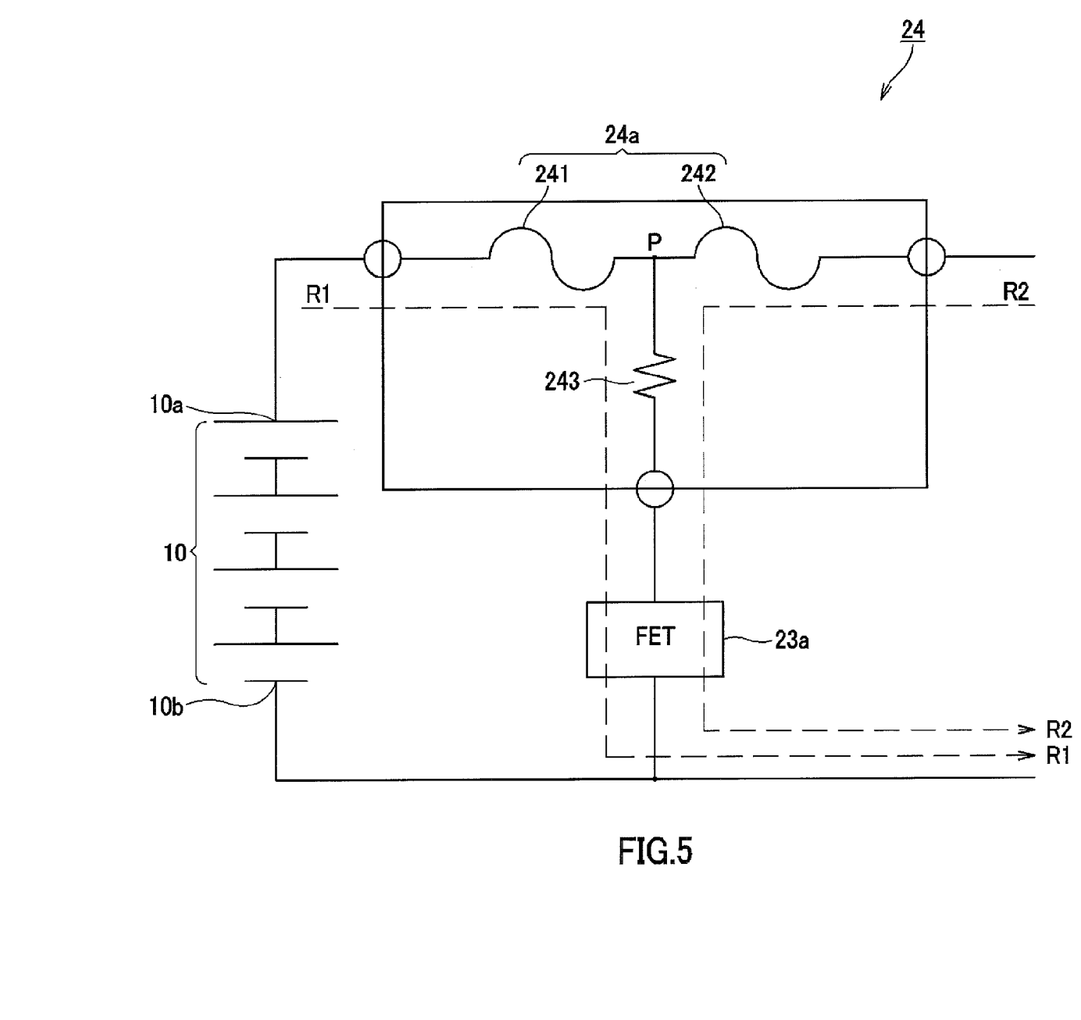
FIG. 5 is a diagram for explaining a configuration of a protective element that realizes a protective function in a charging operation.

When the switch 211 cannot be turned off in an overcharge state and an excess-current state in a charging operation, in order to realize a protective function that fuses the charging current path C flowing through the switch 211, the protective element 24, more specifically, as shown in an equivalent circuit model in FIG. 5, includes fuses 241 and 242 connected in series and the heat generator 243 that fuses fuses 241 and 242 when energization is performed by paths R1 and R2 in FIG. 5 through a connection point P between the fuses 241 and 242.

In the protective element 24 having the above configuration, when the fuses 241 and 242 are regarded as one fusing metal body 24a, the fusing metal body 24a is connected in parallel to the switch 212 that opens/closes the discharging current path D, and the heat generator 243 generates heat. Alternatively, when a current value of the charging current path C flowing through the switch 211 exceeds a first fusing current value corresponding to an excess current in a charging operation, the charging current path C is fused.

In this case, the first fusing current value, as described above, is set in accordance with an excess current in the charging state. More specifically, in order to fuse the charging current path C when the switch 211 cannot be turned off in an excess-current state in the charging operation, the first fusing current value is set to be equal to or larger than a detected current value of the current detection resistor 26 that determines that the switching control unit 22 has an excess current in the charging operation to turn off the switch 211.

More specifically, in an overcharge state, the protective element 24 can perform protection from an overcharge state such that the voltage detection unit 23 turns on the switching transistor 23a, and the heat generator 243 is energized to generate heat so as to fuse the fusing metal body 24a.

When an excess-current state is set in the charging operation, the protective element 24 can perform protection from the excess-current state such that the fusing metal body 24a fuses the charging current path C by self-heating.

The protective element 25 is connected to the discharging current path D flowing through the switch 212, and fuses the discharging current path D self-heating when a current value of the discharging current path D exceeds a second fusing current value that is higher than a current value at which the protective element 24 fuses and that corresponds to an excess current in a discharging operation.

In this case, the second fusing current value is a current value higher than the first fusing current value, and is set in accordance with an excess current in the discharging operation. In other words, the protective element 25 includes a fuse has a rated current value that is higher than that of the fusing metal body 24a of the protective element 24. More specifically, when the switch 212 cannot be turned off in an excess-current state in the discharging operation, in order to fuse the discharging current path D, the second fusing current value is set to be equal to or larger than a detected current value of the current detection resistor 26 that determines that the switching control unit 22 has an excess current in the discharging operation to turn off the switch 212.

In this manner, even though the protective element 25 cannot be turned off the switch 211 in an excess-current state, when a current value exceeds a current value higher than the current value at which the protective element 24 fuses, the protective element 25 fuses the discharging current path D. In this manner, in accordance with an application in which a current value flowing in a discharging state is larger than a current value flowing in a charging state, protection from the excess-current state in the discharging operation can be performed.

Figure 6:
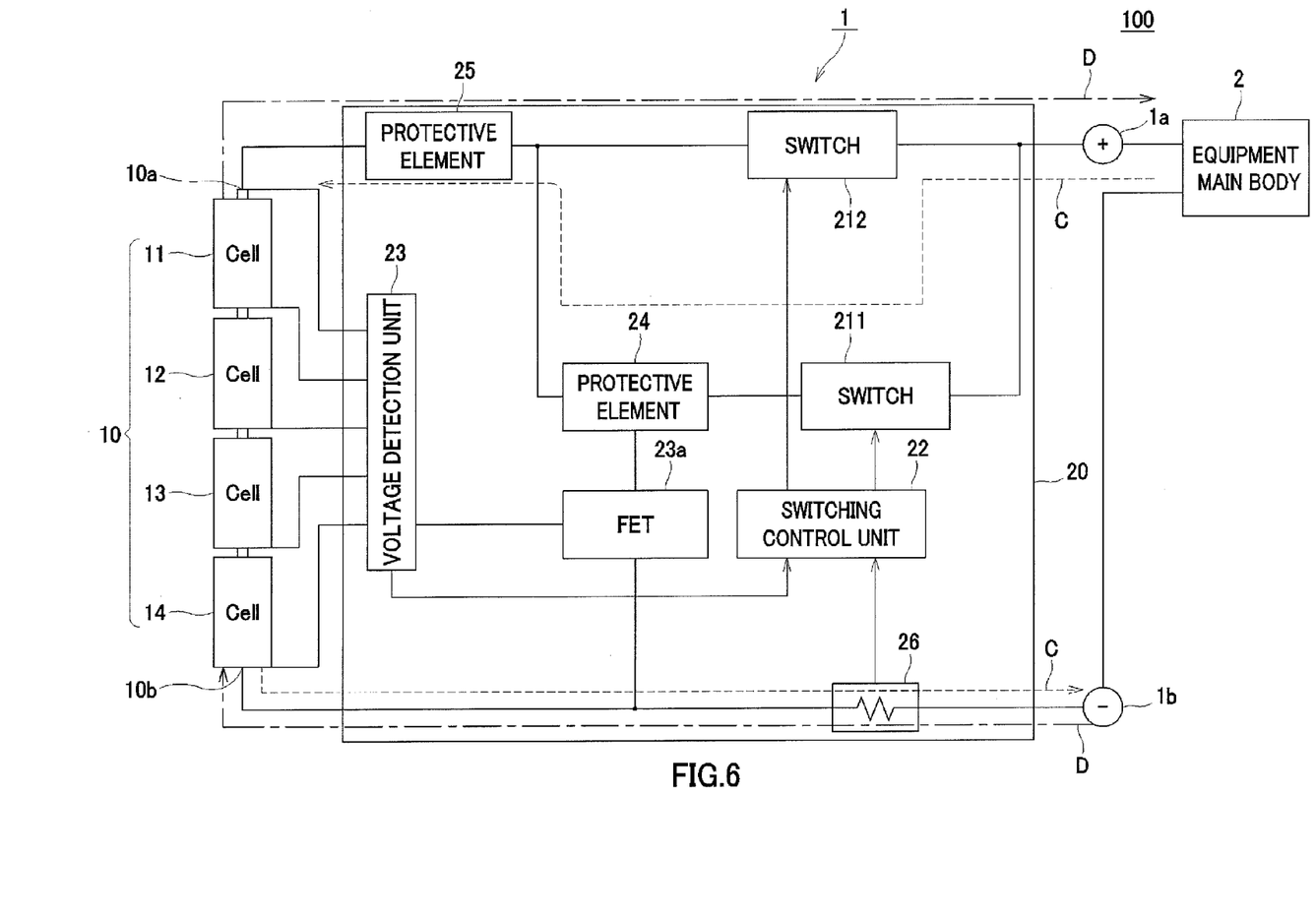
FIG. 6 is a diagram for explaining a modification of the charging/discharging control circuit according to the first embodiment.

The protective element 25 need only be connected on the discharging current path D. For example, as shown in FIG. 6, the protective element 25 may be connected in series with the switch 211 to cause a charging current to flow. In particular, the charging/discharging control circuit 20, in terms of suppression of a resistance of the charging current path C, as shown in FIG. 1, the protective element 25 is specially preferably connected in parallel to the switch 211 that opens/closes the charging current path C.

The current detection resistor 26 is a resistor connected, for example, between the negative terminal 10b of the battery 10 and the negative terminal 1b of the battery pack, converts a current flowing in the battery 10 into a voltage or a temperature to detect the voltage or the temperature, and notifies the switching control unit 22 of a detection result.

In the charging/discharging control circuit 20 having the above configuration, even in a mode of use in which current values flowing in a charging operation and a discharging operation are considerably different from each other, when the switching control unit 22 switches connections to the charging current path C and the discharging current path D by the two switches 211 and 212, for example, in comparison with a structure in which two positive terminals for the charging current path C and the discharging current path D are formed on the battery pack, an increase in device scale caused by an increase in number of terminals can be prevented. In the battery pack in which the two different positive terminals for discharging and charging are arranged, a user may use erroneous terminals. However, in the battery pack in which the charging/discharging control circuit 20 according to the embodiment, such erroneous use can be prevented.

In this manner, in the charging/discharging control circuit 20, even in a mode of use in which current values flowing in a charging operation and a discharging operation are considerably different from each other, while preventing a device scale from being increased and a device from being complex, the two protective elements 24 and 25 having different fusing current values can protect chargeable/dischargeable battery cells from being in both excess-current states in charging and discharging states.

As a comparative example, as a comparative example, if a charging current and a discharging current are caused to flow through the switch 211 without using the switch 212 and the protective element 25 to realize excess-current protection by the protective element 24, in order to realize protection from a discharging current relatively larger than a charging current, in comparison with a case in which protection from only excess-current in a charging state is realized, heat resistance of the fusing metal body 24a must be improved. For this reason, the fusing metal body 24a designed to realize protection from a discharging current relatively larger than a charging current requires a large amount of energy until the fusing metal body 24a fuses even the heat generator 243 is operated in an overcharge state. As a result, a fusing time disadvantageously becomes long.

In contrast to this, in the charging/discharging control circuit 20 according to the embodiment, the fusing metal body 24a of the protective element 24 need only be protected from only an excess current in a charging state. For this reason, in comparison with the comparative example, when an overcharge state occurs, protection can be performed as rapidly as possible. Furthermore, an operation current of the heat generator 243 itself can be held down. As a result, the protective element 24 itself can be reduced in size.

Concrete operations of the switches 211 and 212 performed to realize protection from overcharging, overdischarging, and an excess current will be described below.

Figure 7A:
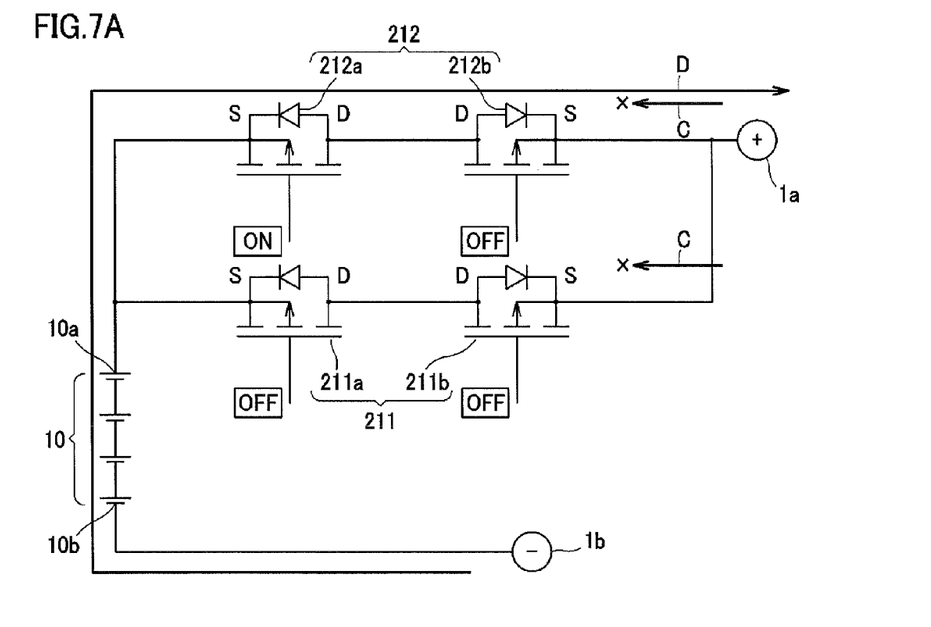
FIG. 7A is a diagram for explaining switching control of a switch when an overcharge state is determined.

In the charging/discharging control circuit 20, in a charging operation, when the switching control unit 22 determines an overcharge state on the basis of voltages of the battery cells 11 to 14 detected by the voltage detection unit 23 (will be described later), as shown in FIG. 7A, it is especially preferable to turn off the two switching transistors 211a and 211b configuring the switch 211 and being in an on state and to turn on, of the two switching transistors 212a and 212b configuring the switch 212, the switching transistor 212a being in an off state and having an direction of bias of a parasitic diode that is opposite to that of the discharging current path D. More specifically, the switching control unit 22 performs such switching control to make it possible to discharge the overcharged battery 10 and return the abnormal state to the normal state as rapidly as possible.

Figure 7B:
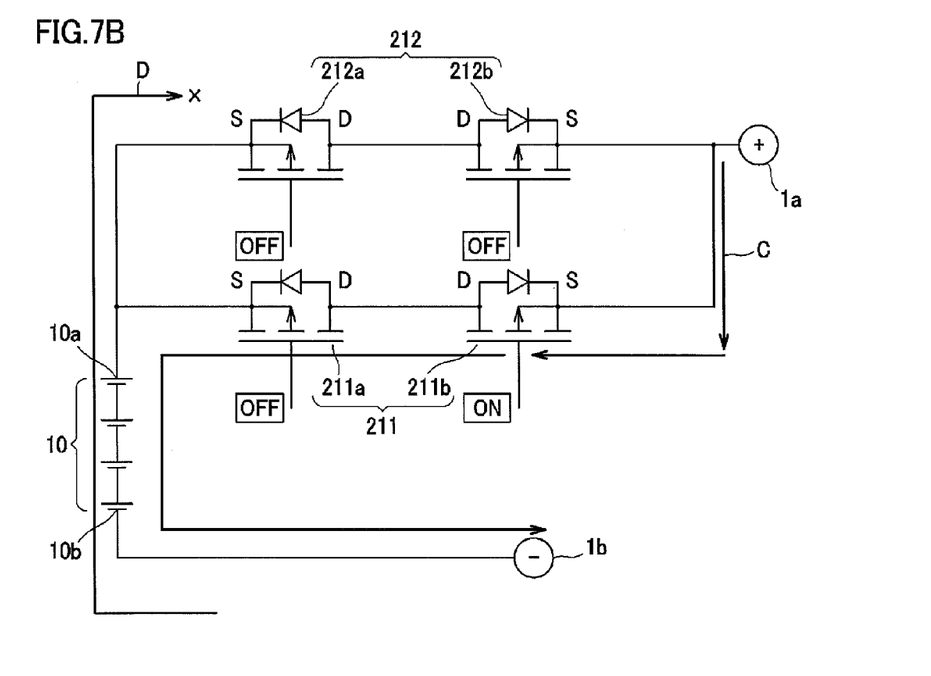
FIG. 7B is a diagram for explaining switching control of the switch when an overdischarge state is determined.

In the charging/discharging control circuit 20, in a discharging operation, an overdischarge state is determined on the basis of voltages of the battery cells 11 to 14 detected by the voltage detection unit 23, as shown in FIG. 7B, it is especially preferable to turn off the two switching transistors 212a and 212b configuring the switch 212 and being in an on state and to turn on, of the two switching transistors 211a and 211b configuring the switch 211, the switching transistor 211b being in an off state and having an direction of bias of a parasitic diode that is opposite to that of the charging current path C. More specifically, the switching control unit 22 performs such switching control to make it possible to charge the overdischarged battery 10 and return the abnormal state to the normal state as rapidly as possible.

Figure 8:
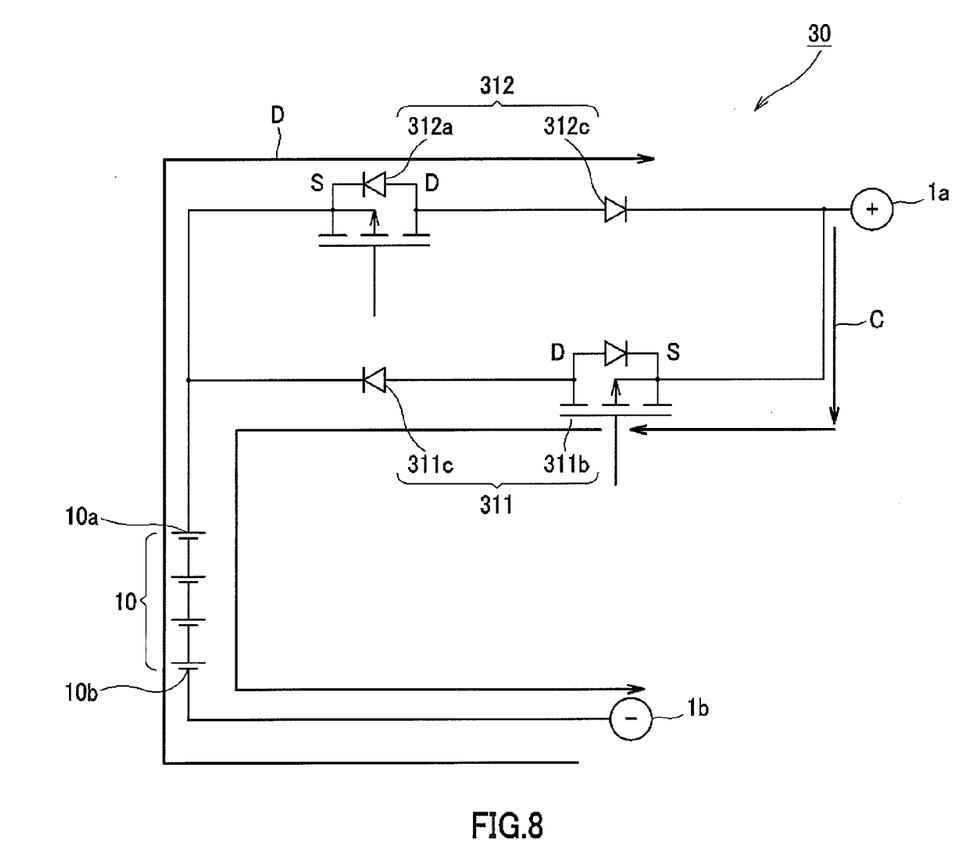
FIG. 8 is a diagram for explaining a concrete configuration of a switch according to the modification.

In the embodiment, in place of the switches 211 and 212, for example, a charging/discharging control circuit 30 including switches 311 and 312 having a configuration as shown in FIG. 8 may be used.

More specifically, as shown in FIG. 8, the switch 311 includes a switching transistor 311b connected on the charging current path C such that a bias direction of a parasitic diode is opposite to a direction of a charging current, and a diode 311c connected on the charging current path C such that a bias direction is the same direction as that of the charging current and is opposite to a direction of a discharging current. As shown in FIG. 8, the switch 312 includes a switching transistor 312a connected on the discharging current path D such that a bias direction of a parasitic diode is opposite to the direction of the discharging current, and a diode 312c connected on the discharging current path D such that a bias direction is opposite to the direction of the charging current and is the same direction as that of the discharging current.

In the charging/discharging control circuit 30 having the switches 311 and 312, in a charging operation, when the switching control unit 22 determines an overcharge state on the basis of voltages of the battery cells 11 to 14 detected by the voltage detection unit 23, the switching transistor 311b of the switch 311 being in an on state are turned off to make it possible to prevent a charging current from flowing in the charging current path C and prevent the charging current from flowing through the discharging current path D by the diode 312c having a bias direction being opposite to the direction of the charging current.

In the charging/discharging control circuit 20, in a discharging operation, when an overdischarge state is determined on the basis of voltages of the battery cells 11 to 14 detected by the voltage detection unit 23, the switching transistor 312a of the switch 312 being in an on state is turned off to make it possible to prevent a discharging current from flowing in the discharging current path D and to prevent the discharging current through the discharging current path D by the diode 311c having a bias direction being opposite to the direction of the discharging current.

As described above, the charging/discharging control circuit 30, as in the charging/discharging control circuit 20, can cut off a flow of charging current in the overcharge state and cut off a flow of discharging current in the overdischarge state. However, the charging/discharging control circuit 20 is preferable more than the charging/discharging control circuit 30 for the following reason.

More specifically, in the charging/discharging control circuit 30, since the diodes 311c and 312c are connected on current paths, in comparison with the charging/discharging control circuit 20, a resistance between the input and the output of the switch is high. In contrast to this, the charging/discharging control circuit 20 can suppress an energy loss caused by an electric resistance as much as possible in comparison with the charging/discharging control circuit 30.

As described above, the charging/discharging control circuit 20, unlike the charging/discharging control circuit 30, is particularly preferable in the way that discharging can be performed at a small loss even in an overcharge state and charging can be performed at a low loss even in an overdischarge state to make it possible to secure a current path such that an abnormal state can return to a normal state as rapidly as possible.

Figure 9:
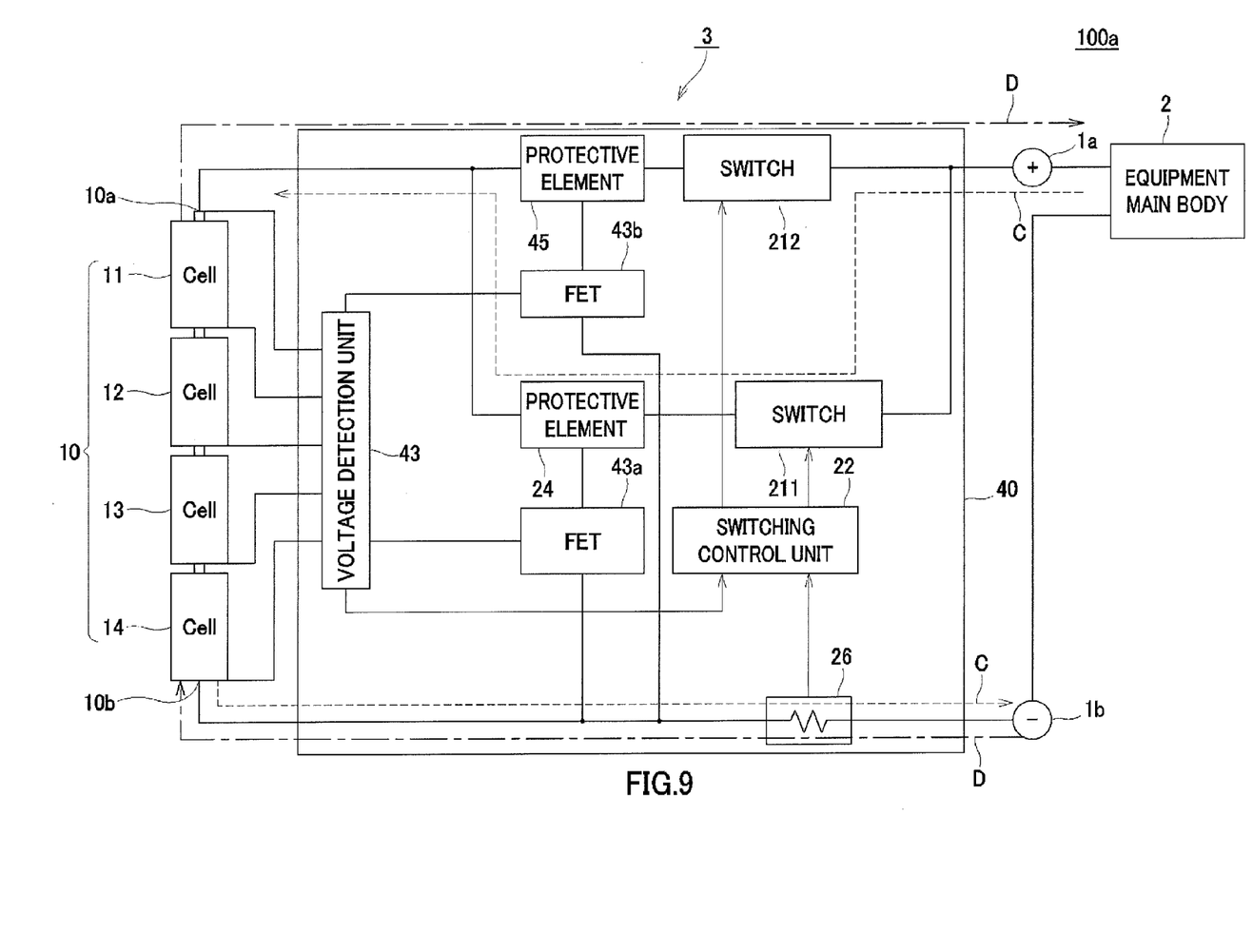
FIG. 9 is a diagram for explaining a configuration of a charging/discharging control circuit according to a second embodiment.

A charging/discharging control circuit 40 according to a second embodiment will be described below with reference to FIG. 9.

More specifically, the charging/discharging control circuit 40 has the same configuration as that of the charging/discharging control circuit 20 except for configurations of a voltage detection unit 43 and a protective element 45 with respect to the charging/discharging control circuit 20 according to the first embodiment. In FIG. 9, for descriptive convenience, the same reference symbols as in the charging/discharging control circuit 20 denote the same configurations as those in the charging/discharging control circuit 20, and a description thereof will be omitted. In this case, it is assumed that the charging/discharging control circuit 40 is incorporated in a battery pack 3. Furthermore, it is assumed that the battery pack 3 is a battery incorporated in electrical equipment 100a and is detachably connected to the equipment main body 2 of the electrical equipment 100a.

More specifically, the voltage detection unit 43, like the voltage detection unit 23 described above, detects voltages of the battery cells 11 to 14 and notifies the switching control unit 22 of detected voltages. In the voltage detection unit 43, in addition to a switching transistor 43a that realizes the same function as the switching transistor 23a of the voltage detection unit 23, a switching transistor 43b to control an operation of the protective element 45 is arranged. In this case, when the voltage detection unit 43 detects that the battery cells 11 to 14 are in an overdischarge state, a charging current path is not cut off by the switch 212, and the voltages are smaller than a predetermined voltage, the voltage detection unit 43 turns on the switching transistor 43b depending on the detection result and fuses the discharging current path D by operating a heat generator 453 of the protective element 45.

Figure 10:
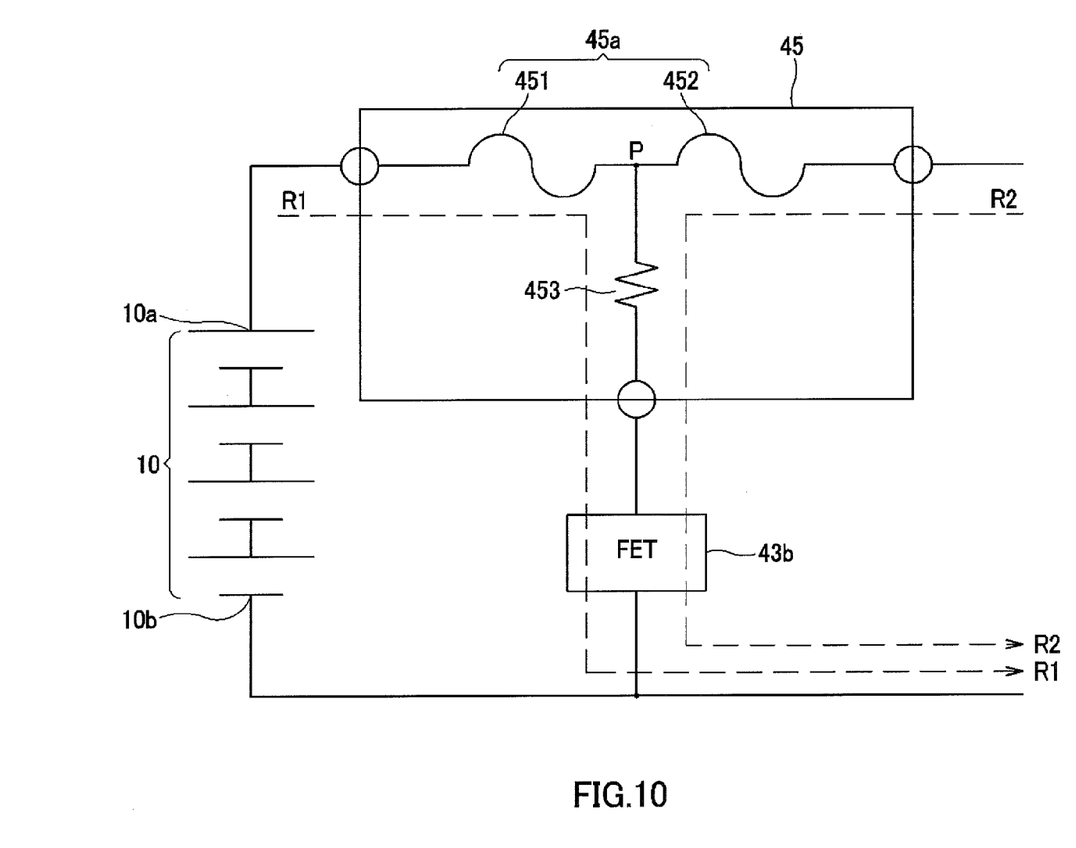
FIG. 10 is a diagram for explaining a configuration of a protective element that realizes a protective function in a discharging operation.

In order to cause the protective element 45 to function as a protective element that fuses the discharging current path D flowing through the switch 212 when the switch 212 cannot be turned off in an overdischarge state and an overdischarge state in a discharging operation, more specifically, as shown in an equivalent circuit model in FIG. 10, the protective element 45 is configured by series-connected fuses 451 and 452 and the heat generator 453 that fuses the fuses 451 and 452 when energization is performed through a connection point P between the fuses 451 and 452.

In the protective element 45 having the above configuration, when the fuses 451 and 452 are configured by one fusing metal body 45a, the fusing metal body 45a is connected in parallel to the switch 211 that opens/closes the charging current path C to cause the heat generator 453 to generate heat, or when a current value of the discharging current path D flowing through the switch 212 exceeds a second fusing current value, the charging current path C is fused.

More specifically, when an overdischarge state occurs, in the protective element 45, the switching transistor 43b is turned on by the voltage detection unit 43, the heat generator 453 is energized to generate heat, and the fusing metal body 45a is fused to realize protection from an overdischarge state.

When an excess-current state occurs in a discharging operation, the protective element 45 can realize protection from the excess-current state in a discharging state such that the fusing metal body 45a fuses the discharging current path D by self-heat-generation.

In this manner, since the charging/discharging control circuit 40 has the protective element 45 that fuses the discharging current path D and that is complex more than that of the charging/discharging control circuit 30, the circuit scale of the charging/discharging control circuit 40 increases. However, even though the discharging current path D cannot be cut off by the switch 312 due to an overdischarge state, a protective function that fuses the discharging current path D can be realized.

REFERENCE SIGNS LIST 1, 3 . . . battery pack, 2 . . . Equipment main body, 11 to 14 . . . battery cell, 1a . . . positive terminal, 1b . . . negative terminal, 10 . . . battery, 10a . . . positive terminal, 10b . . . negative terminal, 20, 30, 40 . . . charging/discharging control circuit, 100, 100a . . . electrical equipment, 211, 212, 311, 312 . . . switch, 211a, 211b, 212a, 212b, 23a, 311b, 312a, 43a, 43b . . . switching transistor, 22 . . . switching control unit, 23, 43 . . . voltage detection unit, 231, 232, 233 . . . temperature detection element, 24, 25, 45 . . . protective element, 241, 242, 451, 452 . . . fuse, 243, 453 . . . heat generator, 24a, 45a . . . fusing metal body, 26 . . . current detection resistor, 311c, 312c . . . diode

The invention claimed is:

1. A charging/discharging control device that controls charging/discharging of a battery arranged in a battery pack and obtained by connecting at least one chargeable/dischargeable battery cell in series, comprising:
- first and second switches that are connected in parallel on current paths between the battery and an external terminal of the battery pack;
- a switching control unit that switches between a charging current path and a discharging current path by turning on the first switch and turning off the second switch during a charging operation and turning off the first switch and turning on the second switch during a discharging operation;
- a first protective element that fuses the charging current path when a current value of the charging current path flowing through the first switch exceeds a first fusing current value; and
- a second protective element that fuses the discharging current path when a current value of the discharging current path flowing through the second switch exceeds a second fusing current value higher than the first current value.

2. The charging/discharging control device according to claim 1, further comprising
a voltage detection unit that detects a voltage of the battery cell, wherein
the first protective element has a heat generator that is energized depending on a detection result obtained when the voltage detection unit detects that the battery cell has a voltage larger than a predetermined voltage to generate heat, and a fusing metal body that is a metal body connection in parallel to the second switch and, when the heat generator generates heat or a current value of a charging current path flowing through the first switch exceeds the first fusing current value, fuses the charging current path.

3. The charging/discharging control device according to claim 1, wherein
the first switch includes two switching transistors connected in series such that directions of biases of parasitic diodes in field effect transistors are opposite to each other,
the second switch includes two switching transistors connected in series such that directions of biases of parasitic diodes in field effect transistors are opposite to each other, and
the switching control unit turns on the two switching transistors configuring the first switch and turns off the two switching transistors configuring the second switch in the charging operation, and turns off the two switching transistors configuring the first switch and turn on the two switching transistors configuring the second switch in the discharging operation.

4. The charging/discharging control device according to claim 3, wherein
the switching control unit,
when the voltage detection unit detects that a value of the battery cell exceeds a predetermined voltage, turns off the two switching transistors configuring the first switch and being in an on state and turns on, of the two switching transistors configuring the second switch, a switching transistor being in an off state and having a direction of bias of a parasitic diode that is opposite to the direction of the discharging current path, and,
when the voltage detection unit detects that the battery cell is smaller than the predetermined voltage, turns off the two switching transistors configuring the second switch and being in an on state and turns on, of the two switching transistors configuring the first switch, a switching transistor being in an off state and having a direction of bias of a parasitic diode that is opposite to the direction of the charging current path.

5. The charging/discharging control device according to claim 1, wherein
the first switch includes a switching transistor connected on the charging current path such that a bias direction of a parasitic diode is opposite to a direction of a charging current and a diode connected on the charging current path such that a bias direction is equal to the direction of the charging current, and
the second switch includes a switching transistor connected on the discharging current path such that a bias direction of a parasitic diode is opposite to a direction of a discharging current and a diode connected on the discharging current path such that a bias direction is equal to the direction of the discharging current.

6. A battery pack that includes
a battery obtained by connecting at least one chargeable/dischargeable battery cell in series and
a charging/discharging control circuit that controls charging/discharging of the battery, wherein
the charging/discharging control circuit comprises:
first and second switches that are connected in parallel on current paths between the battery and an external terminal of the battery pack;
a switching control unit that switches between a charging current path and a discharging current path by turning on the first switch and turning off the second switch during a charging operation and turning off the first switch and turning on the second switch during a discharging operation;
a voltage detection unit that detects a voltage of the battery cell;
a first protective element that fuses the charging current path when a current value of the charging current path flowing through the first switch exceeds a first fusing current value; and
a second protective element that fuses the discharging current path when a current value of the discharging current path flowing through the second switch exceeds a second fusing current value higher than the first current value.

7. Electrical equipment that includes a battery pack having a battery obtained by connecting at least one chargeable/dischargeable battery cell in series and a charging/discharging control circuit that controls charging/discharging of the battery, and
an equipment main body that is detachably connected to the battery pack and charges the battery pack or is driven with a power supply from the battery pack, wherein
the charging/discharging control circuit comprises:
first and second switches that are connected in parallel on current paths between the battery and an external terminal of the battery pack;
a switching control unit that switches between a charging current path and a discharging current path by turning on the first switch and turning off the second switch during a charging operation and turning off the first switch and turning on the second switch during a discharging operation;
a voltage detection unit that detects a voltage of the battery cell;
a first protective element that fuses the charging current path when a current value of the charging current path flowing through the first switch exceeds a first fusing current value; and a second protective element that fuses the discharging current path when a current value of the discharging current path flowing through the second switch exceeds a second fusing current value higher than the first current value.

8. A charging/discharging control method that controls charging/discharging of a battery obtained by connecting at least one chargeable/dischargeable battery cell in series, by using first and second switches that are connected in parallel on current paths between the battery and an external terminal of the battery pack, a charging current path and a discharging current path are switched by turning on the first switch and turning off the second switch during a charging operation and turning off the first switch and turning on the second switch during a discharging operation, a first protective element connected to the charging current path is fused when a current value of the charging current path flowing through the first switch exceeds a first fusing current value, and a second protective element connected to the discharging current path is fused when a current value of the discharging current path flowing through the second switch exceeds a second fusing current value higher than the first current value.

9. The charging/discharging control device according to claim 2, wherein the first switch includes two switching transistors connected in series such that directions of biases of parasitic diodes in field effect transistors are opposite to each other, the second switch includes two switching transistors connected in series such that directions of biases of parasitic diodes in field effect transistors are opposite to each other, and the switching control unit turns on the two switching transistors configuring the first switch and turns off the two switching transistors configuring the second switch in the charging operation, and turns off the two switching transistors configuring the first switch and turn on the two switching transistors configuring the second switch in the discharging operation.

10. The charging/discharging control device according to claim 2, wherein the first switch includes a switching transistor connected on the charging current path such that a bias direction of a parasitic diode is opposite to a direction of a charging current and a diode connected on the charging current path such that a bias direction is equal to the direction of the charging current, and the second switch includes a switching transistor connected on the discharging current path such that a bias direction of a parasitic diode is opposite to a direction of a discharging current and a diode connected on the discharging current path such that a bias direction is equal to the direction of the discharging current.

\* \* \* \* \*